March 28, 1967 T. J. PEREGRIM 3,310,873
ATTITUDE PICKOFF ARRANGEMENT FOR INERTIAL REFERENCE PACKAGE
Filed Aug. 5, 1964 4 Sheets-Sheet 1

THEODORE J. PEREGRIM
INVENTOR.

BY S. A. Giannatana
George B. Oujevolk
ATTORNEYS

March 28, 1967   T. J. PEREGRIM   3,310,873
ATTITUDE PICKOFF ARRANGEMENT FOR INERTIAL REFERENCE PACKAGE
Filed Aug. 5, 1964   4 Sheets-Sheet 3

THEODORE J. PEREGRIM
INVENTOR.

BY S. A. Giarratana
George B. Oujevolk
ATTORNEYS

March 28, 1967   T. J. PEREGRIM   3,310,873
ATTITUDE PICKOFF ARRANGEMENT FOR INERTIAL REFERENCE PACKAGE
Filed Aug. 5, 1964   4 Sheets-Sheet 4

THEODORE J. PEREGRIM
INVENTOR.

BY S. A. Giarratano
George B. Oujevolk
ATTORNEYS

United States Patent Office 3,310,873
Patented Mar. 28, 1967

3,310,873
ATTITUDE PICKOFF ARRANGEMENT FOR INERTIAL REFERENCE PACKAGE
Theodore J. Peregrim, Westford, Mass., assignor to General Precision Inc., Little Falls, N.J., a corporation of Delaware
Filed Aug. 5, 1964, Ser. No. 387,678
3 Claims. (Cl. 33—1)

The present invention relates to inertial navigation, and more particularly to an attitude or orientation identification for an inertial reference system.

It has long been recognized that the theoretical basis of an inertial navigation system is a free gyro, namely a rotating component which will maintain its orientation in space regardless of the movement or acceleration of its environment. Based upon this concept two general types of systems have been devised. The stable platform system contains several accelerometers, usually rate integrating gyros mounted on a platform with an elaborate system of pickoffs coupled to feedback systems which will sense changes in acceleration and maintain the platform in its original orientation. The strapdown system contains components such as gyros mounted on the body of a vehicle. Changes in angular displacement between the gyros and the vehicle are communicated to an elaborate computational apparatus including a direction cosine computer, i.e., a computer which provides sines and cosines from input information fed thereto, and the changes in acceleration are constantly calculated, the original orientation being carried as a memory input. In addition, there are several hybrid systems employing features of both the platform and strapdown system. But the heart of any of these inertial systems is the pickoff arrangement, which provides a signal for processing by the computational apparatus particularly the direction cosine computer, based upon which such signal represents the orientation of the vehicle in inertial space.

Present systems of representing positional data and orientation are an evolution of early map making techniques and generally have to do with projecting a three-dimensional position onto a two-dimensional representation thereof. This is largely because early methods of orientation were designed for human thinking and not for computer processing. Unfortunately, the human makes a rather poor three-dimensional computer at times, since it can usually think in terms of two-dimensional space, most representations of three-dimensional concepts being reduced to a two-dimensional projection. In this light, map systems usually use a polar coordinate system. However, a four-pole polar coordinate system causes ambiguity at the four poles where all the coordinate lines meet. To reduce this ambiguity some early map maker produced the present latitude and longitude system as it is represented on a globe today. To provide sinusoidal information, i.e., direction cosines, the present latitude and longitude system is not entirely suitable and actually, it is the system with the four poles that is preferred. But, as already stated, this system only doubles the ambiguity in the polar regions. Although many attempts may have been made to provide a better polar coordinate system, none, as far as I am aware, has ever been successful when carried out into actual practice.

Therefore, the present invention relates to a pickoff arrangement for providing information to a computer which is free of polar ambiguity.

Another object of the present invention is to provide a readily readable attitude reference or orientation identification system of polar coordinates giving orientation on a globe where the longitudinal coordinate lines do not intersect.

Still another object of the present invention is to provide an attitude pickoff arrangement with considerably less ambiguity than a system where there is the intersection of lines at one of the poles.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

The invention in its broadest aspects contemplates an unambiguous coordinate readout system obtained by dividing a sphere into two substantially equal zones separated by a curved endless double-figure-S-line. Since the conventional baseball cover generally has this configuration, this shape may, for convenience, be referred to as the baseball-cover configuration. This expression, however, is to be interpreted merely as a useful figure-of-speech. No inference is to be drawn therefrom that the curves described are that used on a standard baseball. Quite the contrary, as will be shown herein, a plurality of curves are possible each meeting the requirements. Each zone is divided by a plurality of longitudinal lines emanating from a centrally located axial pole in the other zone.

Other objects and advantages will become apparent from the following description taken in conjunction with the accompanying drawing, in which:

FIGURE 1 is a schematic explanation of an inertial measurement unit gyro package sphere;

FIGURE 2 provides a mathematical model used in the explanation of the pickoff arrangement;

Figure 1:
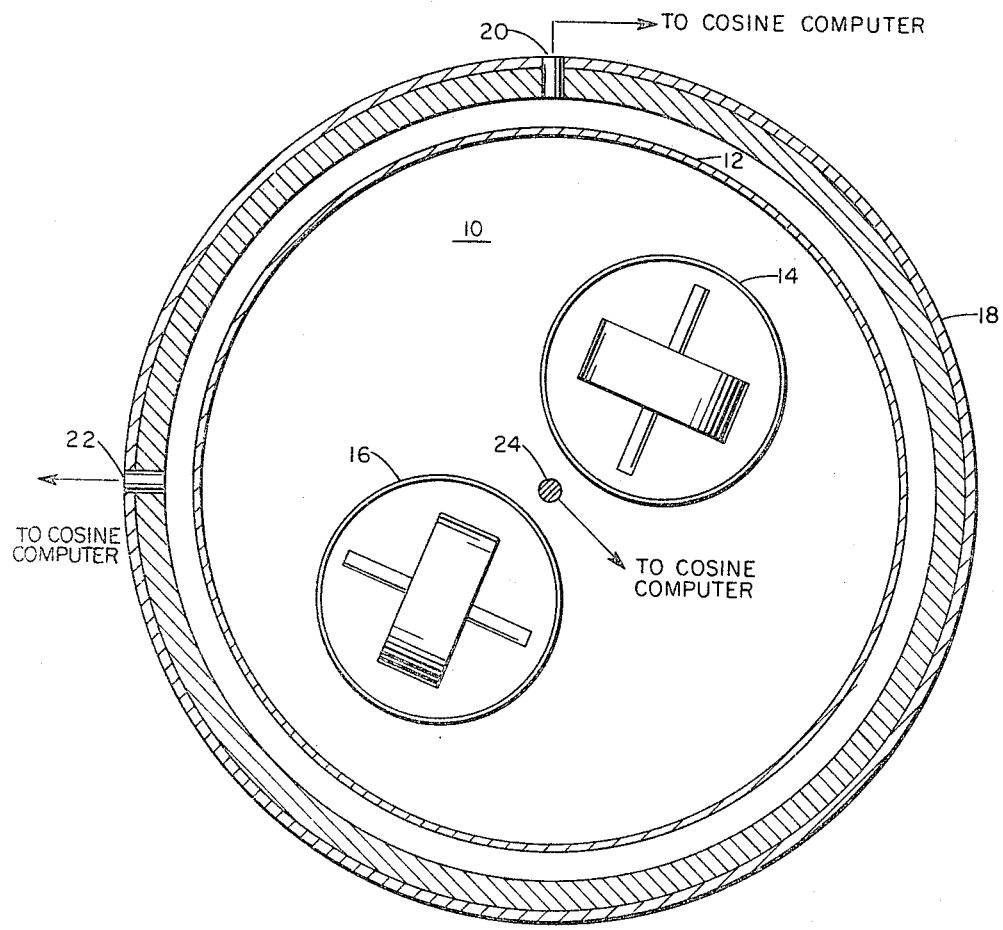

Shown in FIGURE 1 is a gyro package 10 comprising an inner sphere 12 in which are mounted at least two gyros, 14 and 16 with associated electronics, and an outer sphere 18 surrounding inner sphere 12 floated within the outer sphere by an appropriate fluid. Mounted orthogonally in the outer sphere are optical pickoffs 20, 22, and 24 with crosshairs therein. The information from the optical pickoffs is fed to a direction cosine computer. Therefore, the information received by the optical pickoffs must be supplied so that the angle reading is clear and free of ambiguity.

For the purposes of the present invention, the problem of determining attitude may be stated in the following manner. Essentially we have two concentric spheres, one sphere, and in this case for the purpose of illustration, the outer sphere represents body space and the other or inner sphere represents inertial space. There are two sets of coordinates with a common origin at the center of the concentric spheres. One set of coordinates fixed with respect to body space; the other relative to inertial space. The problem is to determine the direction cosines of the set of body space coordinates relative to the set of inertial space coordinates, in other words, the direction cosine matrix relating the two systems. The cosine computer hereinbefore mentioned is simply a computing device which accepts measured data related to the direction cosines and performs the necessary operations to calculate the direction cosines. In the case of a body-mounted system based on rate integrating gyros, the computer accepts incremented angles related to the body rates necessary for the calculation of the direction cosines. In the present attitude pickoff, the direction cosine computer accepts angles trigonometrically related to the direction cosines. The direction cosine computer is not a part of the invention. Before explaning the construction of the contemplated pickoff arrangement, it is necessary to have an understanding of the mathematical background for the pickoff arrangement.

It is desired to determine the direction cosines of three mutually orthogonal axes fixed in the frame of the gyro cluster. These direction cosines would be relative to a coordinate frame fixed with respect to the body in which the gyro package is mounted. For the gyro package, the inner spherical shell is the cluster housing and a coordinate frame attached to it represents the cluster axes. A coordinate frame attached to the outer shell represents the axes fixed relative to the body.

Figure 2:
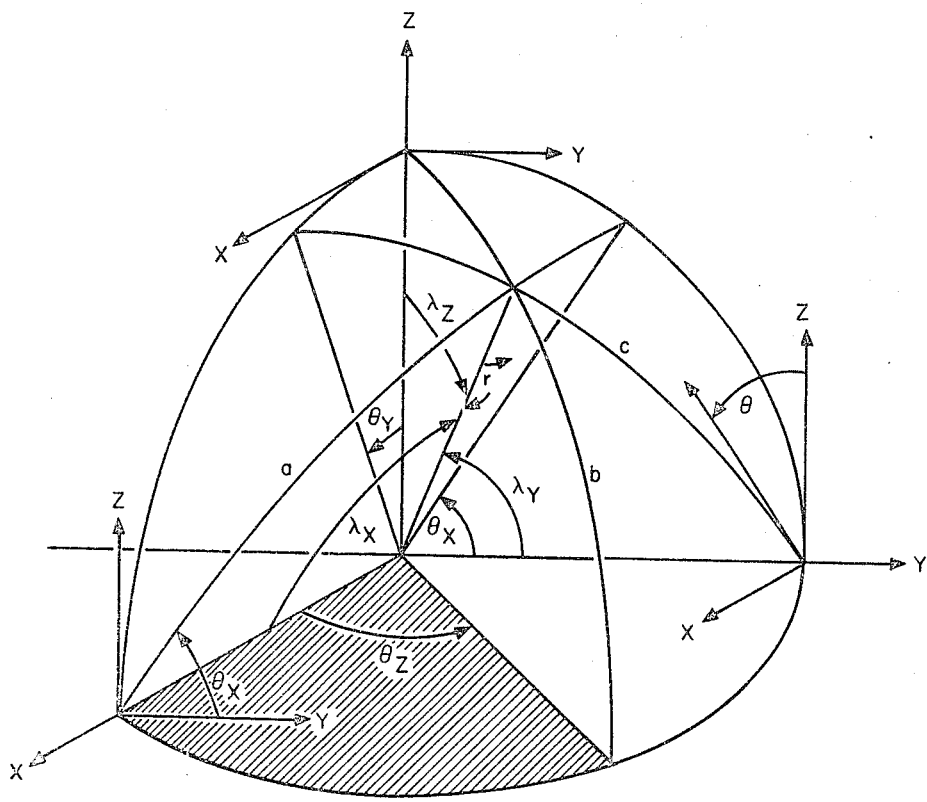

Let us first obtain the direction cosines for one axis located in the gyro cluster (see FIG. 2). Let $x, y, z$ be the coordinate axes fixed in the airframe. These are shown in FIG. 2 located with the origin O at the center of the figure. The other coordinate systems are also shown with origins translated along the $x, y, z$ coordinate axes without rotation to points on the outer shell. Since the spherical shells are concentric, we may draw a position vector from O to a point on the inner shell. This vector represents an axis fixed in the frame of the cluster and is denoted in the diagram by $\vec{r}$. Let us imagine a series of longitudinal lines, with $\vec{r}$ as the generating pole, inscribed on the inner sphere. FIG. 2 shows three such lines, $a, b, c$, which intersect the coordinate axes $x, y, z$, for that particular position of $\vec{r}$ relative $x, y, z$. The angles that the intersection of the planes containing $\vec{r}$, the coordinating axes and the longitude lines make with the $x, y, z$ systems $(\theta_x, \theta_y, \theta_z)$, are related to the cosines of $(\lambda_x, \lambda_y, \lambda_z)$ in the manner derived below. For the purpose of the scheme used, it would not matter if the inner sphere were rotated about $\vec{r}$ since we are interested solely in the angle plane containing a longitude line and $\vec{r}$ makes with a coordinate plane only when it intersects one of the coordinate axes.

From FIG. 2, the components of $\vec{r}$ may be written in the following ways:

(1)  $r_z = r \cos \lambda_z$
     $r_x = r \sin \lambda_z \cos \theta_z$
     $r_y = r \sin \lambda_z \sin \theta_z$ (2)  $r_x = r \cos \lambda_x$
     $r_y = r \sin \lambda_x \cos \theta_x$
     $r_z = r \sin \lambda_x \sin \theta_x$ (3)  $r_y = r \cos \lambda_y$
     $r_x = r \sin \lambda_y \sin \theta_y$
     $r_z = r \sin \lambda_y \cos \theta_y$ Equating components we have:

(4)  $\sin \lambda_y \sin \theta_y = \cos \lambda_x = \sin \lambda_z \cos \theta_z$
     $\sin \lambda_x \cos \theta_x = \cos \lambda_y = \sin \lambda_z \sin \theta_z$
     $\sin \lambda_y \cos \theta_y = \cos \lambda_z = \sin \lambda_x \sin \theta_x$ Now the direction cosines of any line are related by:

(5)  $\cos^2 \lambda_x + \cos^2 \lambda_y + \cos^2 \lambda_z = 1$

Using different combinations of (4) with (5) we have:

(6)  $\sin \lambda_y \cos \theta_y = \sin \lambda_x \sin \theta_x$ (7)  $\dfrac{\cos \theta_x \sin \lambda_y \cos \theta_y}{\sin \theta_x} = \sin \lambda_x \cos \theta_x$ (8)  $\sin^2 \lambda_y = \dfrac{\cos^2 \theta_x \cos^2 \theta_y \sin^2 \lambda_y}{\sin^2 \theta_x}$ (9)  $\sin^2 \lambda_y \left( \dfrac{\sin^2 \theta_x + \cos^2 \theta_x \cos^2 \theta_y}{\sin^2 \theta_x} \right) = 1$

(10) $\sin^2 \lambda_y \left( \dfrac{\sin^2 \theta_x (1 - \cos^2 \theta_y) + \cos^2 \theta_y}{\sin^2 \theta_y} \right) = 1$

(11) $\sin^2 X_y \left( \dfrac{\sin^2 \theta_x (1 - \cos^2 \theta_y) + \cos^2 \theta_y}{\sin^2 \theta_y} \right) = 1$

(12) $\sin^2 X_y = \dfrac{\sin^2 \theta_x}{\sin^2 \theta_x \sin^2 \theta_y + \cos^2 \theta_y} = 1 - \cos^2 \lambda_y$ $\cos^2 \lambda_y = \dfrac{1 - \sin^2 \theta_x}{\sin^2 \theta_x \sin^2 \theta_y + \cos^2 \theta_y}$ $\cos^2 \lambda_y = \dfrac{\sin^2 \theta_x \sin^2 \theta_y + \cos^2 \theta_y - \sin^2 \theta_x}{\sin^2 \theta_x \sin^2 \theta_y + \cos^2 \theta_y}$ $= \dfrac{\sin^2 \theta_x (\sin^2 \theta_y - 1) + \cos^2 \theta_y}{\sin^2 \theta_x \sin^2 \theta_y + \cos^2 \theta_y}$ But, the numerator
$\sin^2 \theta_x (\sin^2 \theta_y - 1) + \cos^2 \theta_y = \cos^2 \theta_y \cos^2 \theta_x$
or the expression for the $\cos \lambda_y$ in terms of $\theta_y, \theta_z$

(13) $\cos^2 \lambda_y = \dfrac{\cos^2 \theta_y \cos^2 \theta_x}{\sin^2 \theta_x \sin^2 \theta_y + \cos^2 \theta_y}$ and also, $\sin \lambda_x \cos \theta_x = \sin \lambda_z \cos \theta_z$

(14) $\sin^2 \lambda_z + \sin^2 \lambda_x \sin^2 \theta_x = 1$ $\sin \lambda_x \cos \theta_x = \dfrac{\sin \lambda_z \sin \theta_z \sin \theta_x}{\cos \theta_x}$

(15) $\sin^2 \lambda_z + \dfrac{\sin^2 \lambda_z \sin^2 \theta_z \sin^2 \theta_x}{\cos^2 \theta_x} = 1$ or

(16) $\cos^2 \lambda_z = \dfrac{\sin^2 \theta_z \sin^2 \theta}{\cos^2 \theta_x + \sin^2 \theta_z \sin^2 \theta_x}$

(17) $\sin^2 \lambda_x + \sin^2 \lambda_y \sin^2 \theta_y = 1$ $\sin \lambda_y \cos \theta_y = \sin \lambda_x \sin \theta_x$ $\sin_y \theta_y \sin \lambda_y = \dfrac{\sin \lambda_x \sin \theta_y \sin \theta_y}{\cos \theta_y}$ $\sin^2 \lambda_x \left( \dfrac{\cos^2 \theta_y + \sin^2 \theta_x \sin^2 \theta_y}{\cos^2 \theta_y} \right) = 1$ or

(18) $\cos^2 \lambda_x = \dfrac{\sin^2 \theta_x \sin^2 \theta_y}{\cos^2 \theta_y + \sin^2 \theta_x \sin^2 \theta_y}$ It will be observed that the expression for $\cos \lambda_y \cos \lambda_x$ is a function of $\theta_x, \theta_y$ alone. By Equation 5, $\cos \lambda_z$ could be expressed in terms of $\theta_x, \theta_y$. Various expressions are possible by use of Eq. (1–5). This is the case since only three of nine direction cosines are independent; and two direction cosines of a line determine the third. Thus by manipulating Equations 1 to 5 in conjunction with (6) we obtain:

$\text{Tan } \theta_z = \cot \theta_x \cot \theta_y$

This may be derived in the following manner:

(19) $\cos^2 \lambda_y + \cos^2 \lambda_x = \dfrac{\cos^2 \theta_y \cos^2 \theta_x + \sin^2 \theta_x \sin^2 \theta_y}{\cos^2 \theta_y + \sin^2 \theta_x \sin^2 \theta_y}$

(20) $\cos^2 \lambda_z = \cos^2 \theta_y - \cos^2 \theta_y \cos^2 \theta_x$

(21) $\cos^2 \lambda_z = \dfrac{\cos^2 \theta_y - \cos^2 \theta_y \cos^2 \theta_x}{\cos^2 \theta_y + \sin^2 \theta_x \sin^2 \theta_y}$ or

(22) $\cos^2 \lambda_z = \dfrac{\cos^2 \theta_y \sin^2 \theta_x}{\cos^2 \theta_y + \sin^2 \theta_x \sin^2 \theta_y}$ but from 15

(23) $$\frac{\sin^2 \theta_z}{\cos^2 \theta_x + \sin^2 \theta_z \sin^2 \theta_x} = \frac{\cos^2 \theta_y}{\cos^2 \theta_y + \sin^2 \theta_x \sin^2 \theta_y}$$

(24) $\cos^2 \theta_y \sin^2 \theta_z + \sin^2 \theta_x \sin^2 \theta_y \sin^2 \theta_z =$
$\cos^2 \theta_y \cos^2 \theta_x + \sin^2 \theta_z \sin^2 \theta_x \cos^2 \theta_y$

(25) $\cos^2 \theta_y \sin^2 \theta_z + \sin^2 \theta_x \sin^2 \theta_y \sin^2 \theta_z =$
$\cos^2 \theta_y \cos^2 \theta_x + \sin^2 \theta_z \sin^2 \theta_x \cos^2 \theta_y$ let
$\cos^2 \theta_y = 1 - \sin^2 \theta_y$

(26) $\sin^2 \theta_z \cos^2 \theta_y + 2 \sin^2 \theta_x \sin^2 \theta_y \sin^2 \theta_z =$
$\cos^2 \theta_y \cos^2 \theta_x + \sin^2 \theta_z \sin^2 \theta_x$ and by manipulation we obtain:

(27) $$\sin^2 \theta = \frac{\cos^2 \theta_y \cos^2 \theta_x}{\cos^2 \theta_y \cos^2 \theta_x + \sin^2 \theta_x \sin^2 \theta_y}$$

(28) $$\cos^2 \theta_z = \frac{\sin^2 \theta_x \sin^2 \theta_y}{\cos^2 \theta_y \cos^2 \theta_x + \sin^2 \theta_x \sin^2 \theta_y}$$

or

(29) $\tan \theta_z = \cot \theta_x \cot \theta_y$

Which means, given any two of the three angles $\theta_x$, $\theta_y$, $\theta_z$, the third is determined. This is not surprising as these angles are related trigonometrically to the direction cosines and again, any two direction cosines of a line determine the third.

The results obtained above can be summarized by saying any pair of angles $\theta_x \theta_y$, $\theta_x \theta_z$, $\theta_z \theta_y$, determine $\vec{r}$ in the $x, y, z$ coordinates. Now assume we have another vector $\vec{r_1}$ perpendicular to $\vec{r}$ defined by a new set longitude lines similar to those defining $\vec{r}$. Then knowing only one angle of $\theta_{x2}, \theta_{y2}, \theta_{z2}$, and any two angles of the three $\theta_x, \theta_y, \theta_z$; determine the direction cosine of three vectors $\vec{r}, \vec{r_1}$ and $\vec{r_2}$ which is perpendicular to $\vec{r}$ and $\vec{r_1}$.

To prove this, consider the following: $\vec{r}$ and $\vec{r_1}$, in terms of direction cosines

(30) $\vec{r} = r(\cos \lambda_x \vec{i} + \cos \lambda_y \vec{j} + \cos \lambda_z \vec{k})$ and

(31) $\vec{r} = \vec{r_1} (\cos \lambda_{1x} \vec{i} + \cos \lambda_{1y} \vec{j} + \cos \lambda_{1z} \vec{k})$
$\vec{r} \cdot \vec{r_1} = 0$

(32) $\cos \lambda_x \cos \lambda_{1x} + \cos \lambda_y \cos \lambda_{1y} + \cos \lambda_z \cos \lambda_{1z} = 0$ Here we consider $\lambda_x$ and $\lambda_y$. These terms are known since they are determined by any two angles $\theta_x \theta_y$, $\theta_x \theta_z$, $\theta_y \theta_z$ (given in the initial statement of the problem).

Now $\theta_{1x}, \theta_{1y}, \theta_{1z}$ obey the Formulas 13, 16, 24 and are related to $\lambda_{1x}, \lambda_{1y}, \lambda_{1z}$ through them. Thus with (13), (16), (24) in (31) we have:

(33) $\cos \lambda_x \cos \theta_{1x} \cos \theta_{1y} + \cos \lambda_y \cos \theta_{1y} \cos \theta_{1x}$
$+ \cos \lambda_z \cos \theta_{1y} \cos \theta_{1x} = 0$ and combining terms and solving for $\theta_{1x}$ we have:

(34) $$\tan \theta_{1x} = \frac{-\cos \lambda_y \cos \theta_{1y}}{\cos \lambda_x \sin \theta_{1y} + \cos \lambda_z \cos \theta_{1y}}$$

and writing again Formula 29

(29) $\tan \theta_{1x} = \cot \theta_{1y} \cot \theta_{1z}$

By knowing any $\theta_z$ and using (34) and (29) combined with (13), (14), (24) we can determine the direction cosines of $\vec{r_1}$.

Now with the knowledge of $\vec{r}$ and $\vec{r_1}$ we can determine an axis perpendicular to $\vec{r}$ and $\vec{r_1}$, thereby determining the orientation of an orthogonal set of coordinates fixed in the cluster, relative to the body coordinates. The third axis is given by:

(35) $\vec{r_2} = \vec{r} + \vec{r_1} = r \vec{r_1} \vec{i_z}$ where $\vec{i_z}$ is the direction of the perpendicular to the plane containing $\vec{r}$ and $\vec{r_1}$ $$r\vec{r_1}\vec{i_z} \begin{Bmatrix} \vec{i} & \vec{j} & \vec{k} \\ r \cos \lambda_x & r \cos \lambda_y & r \cos \lambda_z \\ r_1 \cos \lambda_{1x} & r_1 \cos \lambda_{1y} & r_1 \cos \lambda_{1z} \end{Bmatrix}$$

or the direction cosines of the third axis are:

(36) $\cos \lambda_{1x} = \cos \lambda_{1z} \cos \lambda_y - \cos \lambda_z \cos \lambda_{1y}$
(37) $\cos \lambda_{2y} = \cos \lambda_{1x} \cos \lambda_z - \cos \lambda_{1x} \cos \lambda_{2x}$
(38) $\cos \lambda_{2z} = \cos \lambda_{1x} \cos \lambda_{1y} - \cos \lambda_{1x} \cos \lambda_y$ The foregoing mathematical explanation shows that if the inner sphere of the pickoff-gyro package is inscribed with two sets of longitudinal lines emanating from only two orthogonal poles. The direction cosines of the axis along each pole and the axis normal to the plane containing the two poles can be determined.

Although at first glance this appears to be nothing more than a restatement of a conventional polar coordinate system with the accompanying ambiguity, there is an implied difference; the angles can be selected anywhere.

Figure 4:
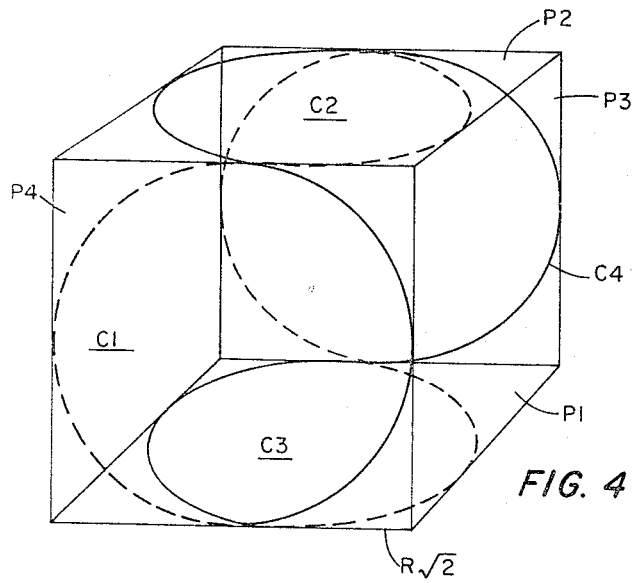
FIGURE 4 is a perspective representation of the problem depicted in FIGURE 3.
Figure 3:
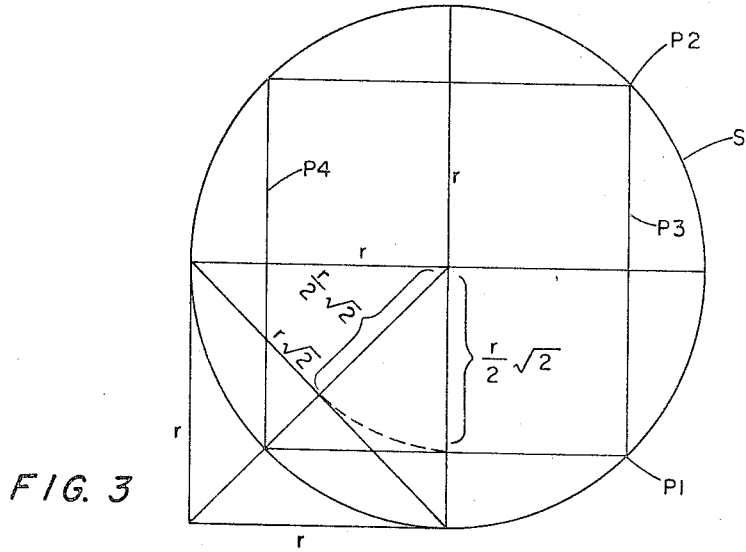
FIGURE 3 is a two-dimensional representation of a problem in solid geometry with which the present invention is concerned.

Consider FIG. 3, therefore, which shows a sphere S having a radius $r$. At a distance from the center equal to $$\frac{r}{2}\sqrt{2}$$

a plane P1 is cut at right angles to the radius. Then three similar orthogonal planes, P2, P3, and P4 are cut. The intersections of these planes with sphere S form four circles, $C_1, C_2, C_3, C_4$ around the sphere, each circle is then tangent to a circle at right angles thereto, as shown in FIG. 4.

Figure 5:
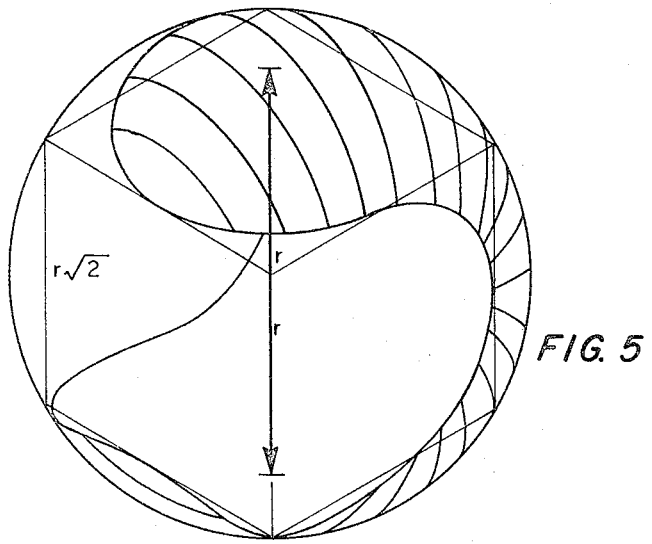
FIGURE 5 is another perspective representation similar to FIGURE 4, but including longitudinal coordinate lines; and, FIGURE 6 is a perspective view of the baseball-cover coordinate system contemplated herein.
Figure 6:
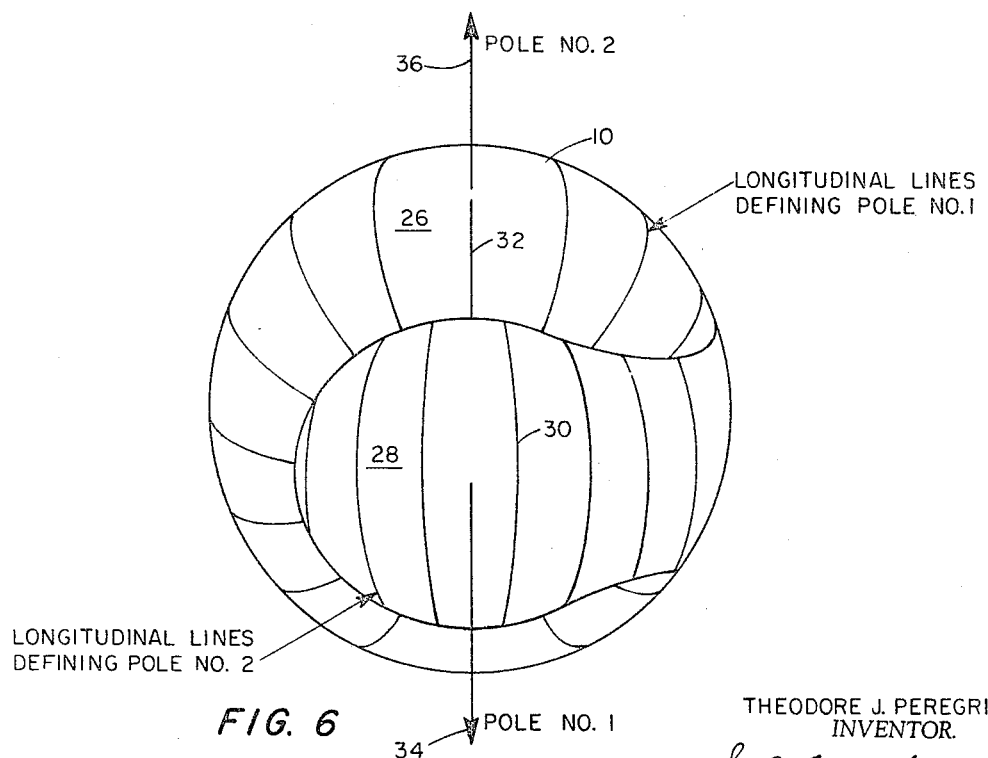

Considering therefore one set only of semicircles aligned in parallel planes and another set of aligned semicircles in parallel planes but orthogonal to the first two planes, with proper orientation of the semicircles there is provided a double Figure-S curved surface, the width of which is a chord having a length of $r\sqrt{2}$. Effectively, the sphere S has therefore been divided into two zones of equal area by a baseball cover configuration as shown in FIG. 5.

Centering two pairs of orthogonal axial poles at the circular center of each of the orthogonal semicircles, coordinate lines emanating from the poles are then inscribed, the lines from each axial pair of poles being inscribed in the zone not containing the poles from which the lines emanate. The longitudinal lines are equi-angularly separated in each zone.

A study of FIGS. 3 to 6 shows that the width of one of the zones is a chord having a length of $r\sqrt{2}$. However, it is at once readily apparent that this dimension can be altered somewhat without affecting the accuracy of the scheme. In fact, a glance at a standard baseball cover will immediately show this chord to be somewhat smaller at the center providing an hour-glass shape. Instead of circles $C_1, C_2, C_3, C_4$, ellipses are used.

Obviously, it is then sufficient for the width across the center of one of the areas to be such as to oe subtended by a chord of the order of, but smaller than, $r\sqrt{2}$. This simplifies matters considerably in construction. Spherical configurations are plagued with the value $\pi$ or pi which is difficult to represent digitally. There is thus no need to add to the complication bf using a value corresponding to the $\sqrt{2}$, another value difficult to render in digital form. By having the zones in an hour-glass configuration a value corresponding to 1¼ (1.25) can be used instead of $\sqrt{2}$.

The surface inner sphere 10 housing the gyro cluster is thus divided into two equal areas, 26 and 28, of baseball-cover configuration. In each area longitudinal lines 30 and 32 are set on the surface emanating from a pole 34, 36 in the other area. The longitudinal lines in their respective areas never converge on the poles they define. This avoids the problem of reduced resolution as the polar regions are approached. Three optical lens systems containing reference crosshairs capable of rotation only about their optical axis are mounted in the outer spherical shell of the pickoff-gyro package, and are shown in FIG. 1; the optical axes are orthogonal and normal to the outer shell and define the three reference axes of the body. The two poles defined by the longitudinal lines inscribed on the sphere, plus the third mathematically determined pole, represent the three axes of the reference sphere. In operation, the crosshairs of the optical lens systems are aligned parallel to the longitude lines passing directly under the respective optical axis (see Equation 29). These angles that the direction of the longitudinal lines make with the reference axes are related mathematically to the direction cosines between body and cluster coordinate systems. In order to obtain a precise result from this readout scheme, two lens systems must look at the same set of longitudinal lines concurrently while the third system is measuring the direction of the other set of lines. If the three lens systems view the same set of longitudinal lines, or if an optical axis is directly on the line dividing two areas, a degeneracy or ambiguity occurs.

Any ambiguity or degeneracy can be removed by using two or three redundant lens systems, each set having three pickoffs and with a logic arrangement. By properly offsetting the separate lens systems, any of the aforementioned ambiguity or degeneracy may be removed.

For the purpose of zone identification, the two zones can be described as "red" and "blue" areas, and the lines thereon as red and blue lines.

The photosensitive detector must be instrumented to identify red and blue lines as well as boundary lines which we can term "black" lines.

Basically, the present invention provides for a grid coordinate arrangement useful in space navigation and comprises a spherical support; two symmetrical zones of about equal area and the same geometric configuration defined on said support, said zones being of double-S, hour-glass configuration, the smallest width of the zone being of the order of the radius of the sphere multiplied by the square root of two, the one and the other zone extending across the two poles in the one and the other axes and respectively having a surface area of pi multiplied by twice the square of the radius of the sphere, the lengthwise centerline of each zone partially extending along a circumferential line of the sphere an equal distance beyond each pole in said respective one and the other axes; each zone being laterally traversed by a series of equi-angularly spaced longitudinal lines, the lines in the one zone emanating from the poles of the other axis and the lines in the other zone emanating from the poles of the one axis. The double-S configuration may be formed by constructing two pairs of semi-circles on the spherical support, each pair being aligned in parallel planes and at right angles to the other pair, each having a diameter equal to the radius of the sphere multiplied by the square root of two. The double-S configuration will acquire the hour-glass configuration if instead of semi-circles, semi-ellipses are formed, the ellipses being cut in half at their narrow axes, adjacent semi-ellipses in orthogonal planes being joined at their point of tangency.

It is to be observed therefore that the present invention provides for a coordinate system and includes a spherical surface having detectable indicia thereon for representing the orientation of said indicia with respect to a frame of reference fixed relative thereto. Said indicia comprises: a first group of curvilinear stripes occupying a first area amounting substantially to one-half the total area of said surface, said stripes individually constituting segments of respective great circles on said spherical surface which great circles intersect at both poles defined by a first diametrical axis of the spherical surface; a second group of curvilinear stripes occupying a second area amounting substantially to one-half the total area of said spherical surface, said stripes of the second group individually constituting segments of respective great circles on said spherical surface, which great circles intersect at both poles defined by a second diametrical axis of the spherical surface perpendicular to said first diametrical axis; the demarcation between said first and second areas taking the form of a closed curve of double-S configuration.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. A grid coordinate arrangement useful in space navigation, comprising in combination a sphere coordinate support; two symmetrical zones of equal area and identical geometric configuration defined on said support, said zones being of double-S configuration, the smallest width of the zone being of the order of the radius of the sphere multiplied by the square root of two, the one and the other zones extending across the two poles in the one and the other axes of the zones and respectively having a surface area of pi multiplied by twice the square of the radius of the sphere, the lengthwise centerline of each zone partially extending along a circumferential line of the sphere an equal distance beyond each pole in said respective one and the other axis; longitudinal lines laterally traversing each zone, equi-angularly spaced, the lines in the one zone emanating from the poles of the other axis, and the lines in the other zone emanating from the poles of the one axis.

2. A device as claimed in claim 1, said double-S configuration being formed from two pairs of semi-circles on the spherical support, each pair being aligned in parallel planes and at right angles to the other pair, each having a diameter equal to the radius of the sphere multiplied by the square root of two.

3. A device as claimed in claim 1, said double-S configuration having an hour-glass configuration being formed by two pairs of semi-ellipses cut in half at their narrow axes, said pairs of semi-ellipses being disposed in orthogonal planes and joined at their point of tangency.

References Cited by the Examiner
UNITED STATES PATENTS 2,845,710  8/1958  Claret et al. _____ 33—1

LEONARD FORMAN, *Primary Examiner.*

W. C. MARTIN, *Assistant Examiner.*